United States Patent
Tanaami et al.

(10) Patent No.: US 12,420,423 B2
(45) Date of Patent: Sep. 23, 2025

(54) FUSION WELDING DEVICE AND FUSION WELDING DEVICE CONTROL METHOD

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 352 days.

(21) Appl. No.: 17/853,101

(22) Filed: Jun. 29, 2022

(65) Prior Publication Data
US 2023/0055372 A1    Feb. 23, 2023

(30) Foreign Application Priority Data
Aug. 18, 2021 (JP) ................. 2021-133258

(51) Int. Cl.
| | |
|---|---|
| *B25J 9/16* | (2006.01) |
| *B23K 37/02* | (2006.01) |
| *B25J 11/00* | (2006.01) |
| *B25J 13/08* | (2006.01) |
| *B25J 15/00* | (2006.01) |

(52) U.S. Cl.
CPC ......... *B25J 9/1684* (2013.01); *B23K 37/0229* (2013.01); *B25J 11/005* (2013.01); *B25J 13/085* (2013.01); *B25J 15/0019* (2013.01)

(58) Field of Classification Search
CPC ...... B25J 9/1684; B25J 11/005; B25J 13/085; B25J 15/0019; B25J 9/1633; B25J 9/1653; B25J 9/1664; B25J 19/02; B23K 37/0229; B23K 9/126; B23K 26/037; B23K 9/12; G05B 2219/37274; G05B 2219/39322; G05B 2219/40582; G05B 2219/45104
See application file for complete search history.

(56) References Cited

U.S. PATENT DOCUMENTS

| | | | |
|---|---|---|---|
| 2003/0173341 A1 | 9/2003 | Matsushita | |
| 2011/0180516 A1* | 7/2011 | Takahashi | B23K 11/255 |
| | | | 219/86.41 |
| 2011/0218676 A1* | 9/2011 | Okazaki | B25J 9/1075 |
| | | | 901/29 |

(Continued)

FOREIGN PATENT DOCUMENTS

| | | | |
|---|---|---|---|
| DE | 102014116830 | * | 5/2016 |
| DE | 102015119424 A1 | | 5/2017 |

(Continued)

OTHER PUBLICATIONS

Japanese Office Action for Japanese Patent Application No. 2021-133258 issued on Jan. 7, 2025 and English machine translation thereof.

*Primary Examiner* — Hongye Liang
(74) *Attorney, Agent, or Firm* — Harness, Dickey & Pierce, P.L.C.

(57) ABSTRACT

A fusion welding device includes: a robot arm; a fusion welding hand attached to the robot arm and including a fusion welding head for fusing and joining together workpieces while being separated from the workpieces; a support provided to the fusion welding hand and abutting on the workpieces; a force sensor for detecting a force and a moment exerted, through the support, by the workpieces; and a control section configured to control motion of the robot arm in accordance with parameters calculated from a signal outputted from the force sensor.

8 Claims, 8 Drawing Sheets

(56) References Cited

U.S. PATENT DOCUMENTS

2021/0316444 A1 * 10/2021 Hatano ................. B25J 13/081

FOREIGN PATENT DOCUMENTS

| | | | |
|---|---|---|---|
| JP | S60-217047 A | | 10/1985 |
| JP | S6133770 | * | 2/1986 |
| JP | H05-27274 A | | 2/1993 |
| JP | H05-242948 A | | 9/1993 |
| JP | H07-047472 A | | 2/1995 |
| JP | H10-085948 A | | 4/1998 |
| JP | 2002-219579 A | | 8/2002 |
| JP | 2003-266188 A | | 9/2003 |
| JP | 2012-139691 A | | 7/2012 |
| JP | 2018-189151 A | | 11/2018 |
| JP | 2019-115918 A | | 7/2019 |
| JP | 2019-150852 A | | 9/2019 |

* cited by examiner

FUSION WELDING DEVICE AND FUSION WELDING DEVICE CONTROL METHOD

This Nonprovisional application claims priority under 35 U.S.C. § 119 on Patent Application No. 2021-133258 filed in Japan on Aug. 18, 2021, the entire contents of which are hereby incorporated by reference.

TECHNICAL FIELD

The present invention relates to a fusion welding device including a force sensor.

BACKGROUND ART

There are conventional welding devices in which a robot is used. For example, Patent Literature 1 discloses a welding device including a welding robot and a welding hand attached to an arm of the welding robot. The welding device includes a force sensor. The force sensor is disposed between the top end of the arm of the welding robot and the welding hand including a plurality of electrode tips. The plurality of electrode tips hold workpieces so as to sandwich the workpieces therebetween, so that the force sensor detects the deflection of the workpieces with respect to the welding hand. The arm of the robot is controlled by a control section such that the input value of a detection signal from the force sensor falls within a preset range. As a result, the position of the welding hand with respect to the workpiece is controlled.

CITATION LIST

Patent Literature

[Patent Literature 1]
Japanese Patent Application Publication, Tokukai No. 2002-219579

SUMMARY OF INVENTION

Technical Problem

Welding methods are categorized into fusion welding, pressure welding, and brazing and soldering. Fusion welding refers to a welding method of fusing and joining together workpieces. Fusion welding is carried out with a fusion welding hand being separated from the workpieces. It is therefore impossible to detect, by using a force sensor, a force acting on the fusion welding hand from the workpieces. As a result, it is impossible to control the position of the fusion welding hand with respect to the workpieces by using the force sensor. This makes impossible the control, as disclosed in Patent Literature 1, of the position and the angle of the fusion welding hand with respect to the workpieces by using the force sensor.

An aspect of the present invention has been made in view of the above problem, and an object thereof is to provide a fusion welding device for controlling the position and the angle of a fusion welding hand with respect to workpieces by using a force sensor and a fusion welding device control method.

Solution to Problem

A fusion welding device in accordance with an aspect of the present invention includes: a robot arm; a fusion welding hand attached to the robot arm and including a fusion welding head for fusing and joining together workpieces while being separated from the workpieces; a support provided to the fusion welding hand and abutting on the workpieces; a force sensor for detecting a force and a moment exerted, through the support, by the workpieces; and a control section configured to control motion of the robot arm in accordance with parameters calculated from a signal outputted from the force sensor, so that the above problem is solved.

Advantageous Effects of Invention

An aspect of the present invention provides a fusion welding device for accurately controlling the position of a fusion welding hand with respect to workpieces and a fusion welding device control method.

DESCRIPTION OF EMBODIMENTS

The following description will discuss a fusion welding device, by taking a case of arc welding for example. As used in the present application, the term "fusion welding" refers to a welding method of joining workpieces together by discharging energy toward a joint between the workpieces with a fusion welding hand being separated from the workpieces to heat or fuse the joint. Examples of the welding method include gas welding, arc welding, electroslag welding, electron beam welding, and laser beam welding. In the present application, what are discharged from a fusion welding head and transferred to the workpieces (electricity, light and heat) are collectively expressed as "energy".

Embodiment 1

Figure 1:
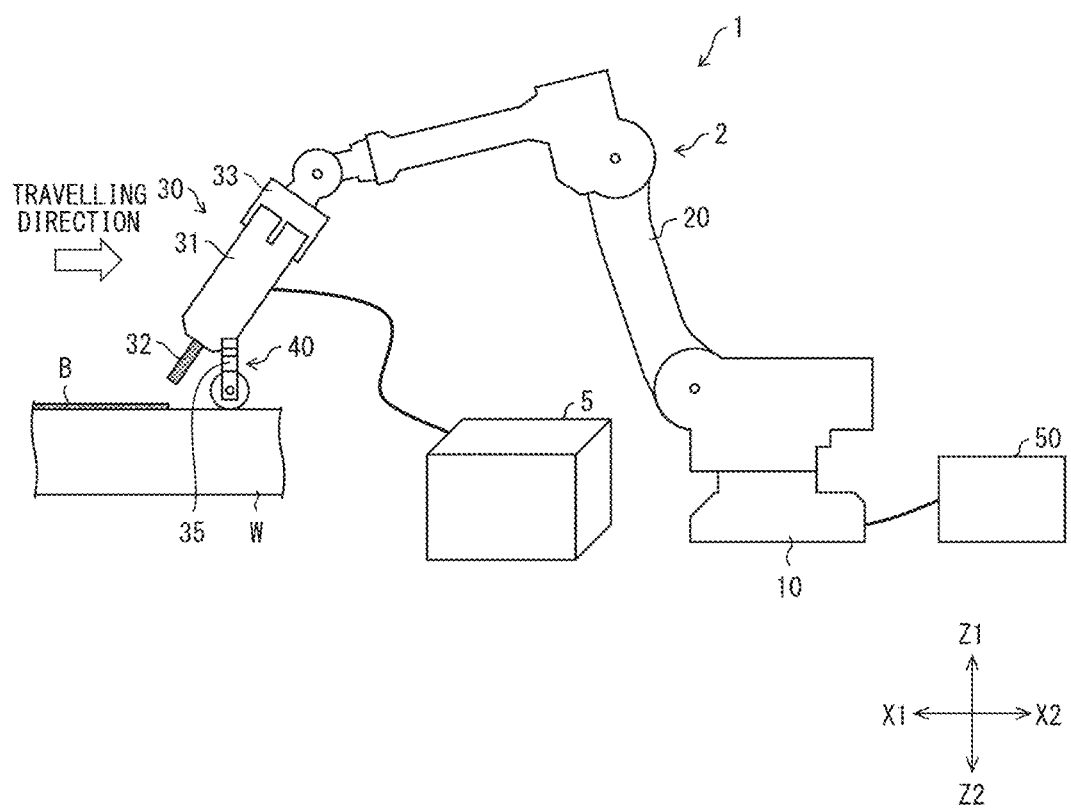
FIG. 1 is an overall view of the structure of a fusion welding device in accordance with Embodiment 1 of the present invention.
Figure 2:
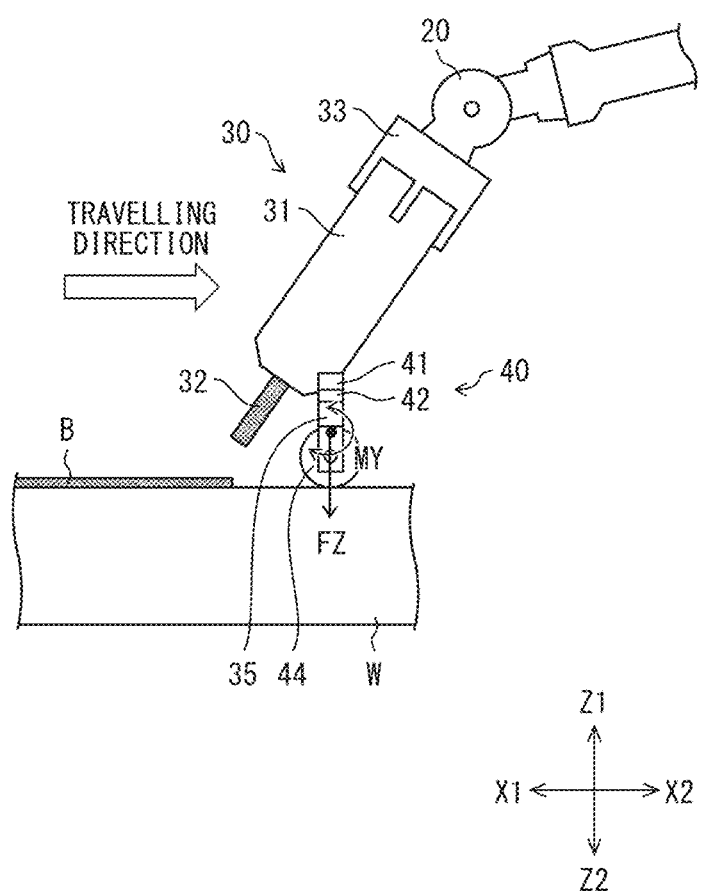
FIG. 2 is a view of a main part of the fusion welding device in accordance with Embodiment 1 of the present invention.
Figure 3:
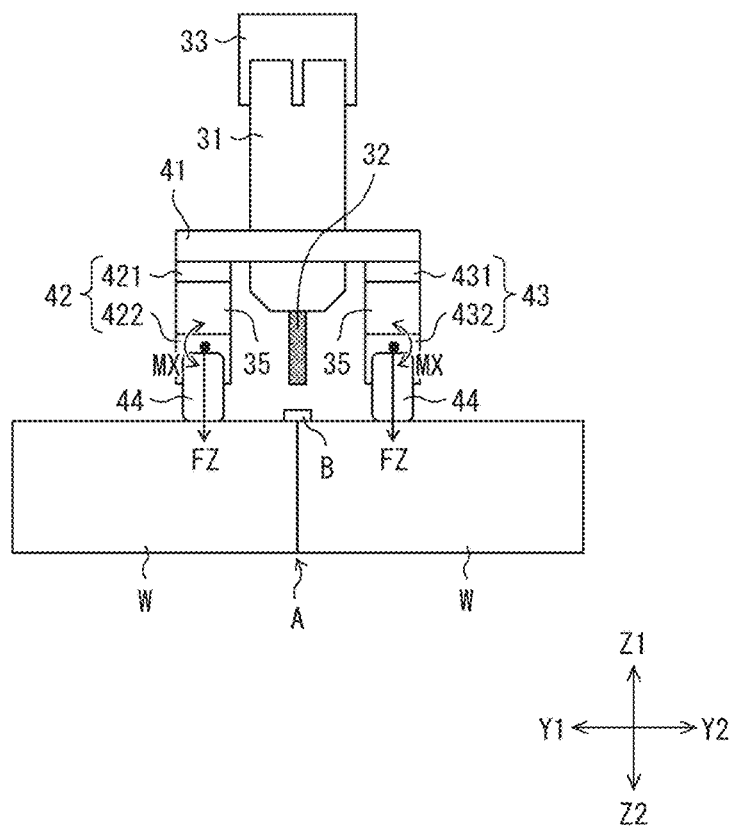
FIG. 3 is a view of a fusion welding hand illustrated in FIG. 2 as seen from an X1 direction.
Figure 4:
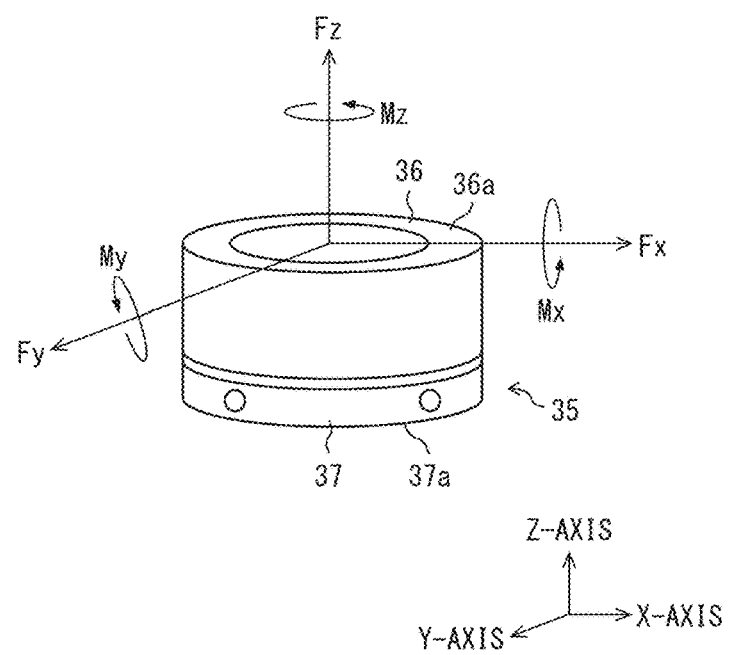
FIG. 4 is a view of a force sensor disposed in the fusion welding device illustrated in FIG. 1.
Figure 5:
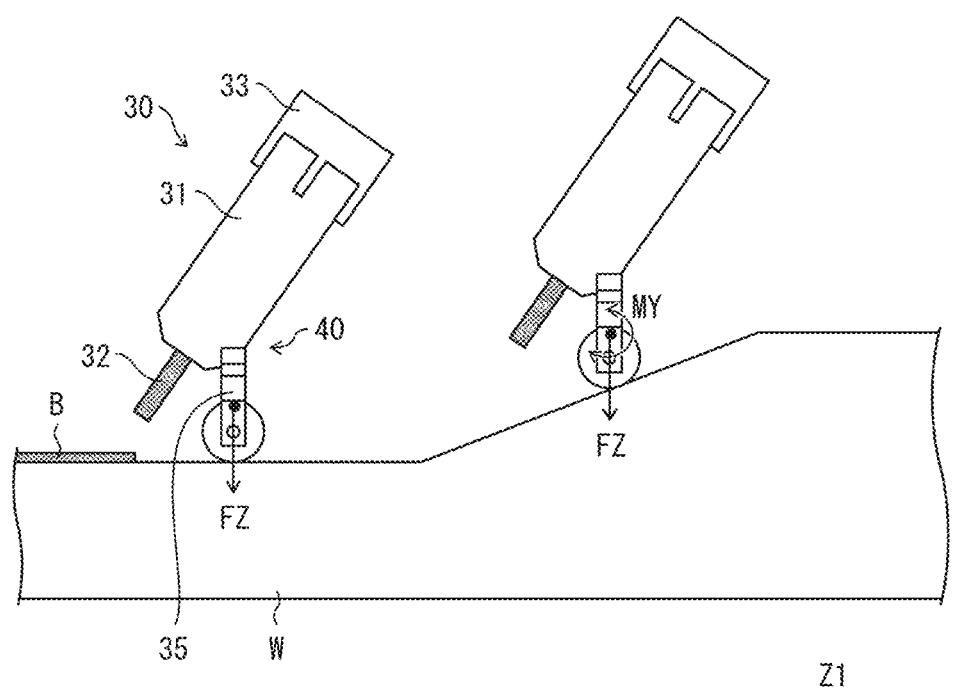
FIG. 5 is a view for explaining a force and a moment acting on a support.

The following description will discuss in detail an embodiment of the present invention with reference to FIGS. 1 to 5. FIG. 1 is an overall view of the structure of a fusion welding device 1 in accordance with Embodiment 1 of the present invention. FIG. 2 is a view of a main part of the fusion welding device 1 in accordance with Embodiment 1 of the present invention. FIG. 3 is a view of a fusion welding hand 30 illustrated in FIG. 2 as seen from an X1 direction. FIG. 4 is a view of a force sensor 35 disposed in the fusion welding device 1 illustrated in FIG. 1. FIG. 5 is a view for explaining a force and a moment acting on a support 40. For convenience in explaining the components of the fusion welding device 1 and positional relationships, coordinate axes along three directions as illustrated in FIG. 1, etc., which are an X (X1-X2) direction, a Y (Y1-Y2) direction, and a Z (Z1-Z2) direction, are used for definition.

The fusion welding device 1 includes: a fusion welding operating section 5; a fusion welding robot 2; and a control device 50, as illustrated in FIG. 1.

The fusion welding operating section 5 is connected to the fusion welding hand 30. The fusion welding operating section 5 is a mechanism for discharging energy from a fusion welding head 32. The fusion welding operating section 5 is controlled by the control device 50 (described later) to supply the fusion welding hand 30 with electric power. The fusion welding operating section 5 includes a fusion welding power supply section for applying a voltage on the fusion welding head 32 and workpieces W. The fusion welding operating section 5 may include a fusion material supply section for supplying, for example, a wire, or may include a gas supply section for supplying a shielding gas or an active gas.

The workpieces W to be fusion welded are metals. As an example of a joint between the workpieces W, a butt joint in which the workpieces W butt against each other is illustrated. However, the joint between the workpieces is not limited thereto, and may be a T joint, a corner joint, or other joint. Further, the workpieces to be fusion welded may be workpieces each having a groove formed on the joint.

The control device 50 controls the fusion welding device 1.

The fusion welding robot 2 includes: a base 10; a robot arm 20; the fusion welding hand 30; and a support 40. The base 10 is fixed on a floor face.

The robot arm 20 is provided on the base 10. The robot arm 20 has a base end attached to the base 10. The robot arm 20 is rotatably attached to the base 10. The robot arm 20 includes a plurality of limbs. Those of the limbs of the robot arm 20 that are adjacent to each other are rotatably articulated with each other. The robot arm 20 has a top end attached to the fusion welding hand 30.

The fusion welding hand 30 is a hand for fusing and joining together the workpieces W. The fusion welding hand 30 is provided with an attachment member 33. The fusion welding hand 30 is connected to the robot arm 20 via the attachment member 33.

The fusion welding hand 30 includes: a hand body 31; and the fusion welding head 32. The fusion welding head 32 is provided at the top end of the hand body 31. The fusion welding head 32 is a section that discharges energy toward a joint A of the workpieces W while being separated from the workpieces W. In Embodiment 1, the fusion welding head 32 is an electrode for forming the arc which is electric energy.

The fusion welding hand 30 is provided with the support 40. The support 40 is a member that abuts on the workpieces W. The support 40 is fixed so as to form a predetermined angle with the fusion welding hand 30. More specifically, the support 40 is attached to the hand body 31 by using an attachment tool (not illustrated). In this manner, the support 40 is fixed to the fusion welding hand 30.

As illustrated in FIGS. 2 and 3, the support 40 includes: a first columnar part 42; a second columnar part 43; and a connection part 41.

The first columnar part 42 and the second columnar part 43 are members extending in a direction (Z2 direction) from the fusion welding hand 30 to the workpieces W. The first columnar part 42 includes: a hand-side first columnar part 421; and a workpiece-side first columnar part 422. Disposed between the hand-side first columnar part 421 and the workpiece-side first columnar part 422 is the force sensor 35, which will be described later. The second columnar part 43 includes: a hand-side second columnar part 431; and a workpiece-side second columnar part 432. Disposed between the hand-side second columnar part 431 and the workpiece-side second columnar part 432 is the force sensor 35. The force sensor 35 may be disposed between the connection part 41 and an end, closer to the fusion welding hand 30, of the first columnar part 42 and between the connection part 41 and an end, closer to the fusion welding hand 30, of the second columnar part 43.

The first columnar part 42 and the second columnar part 43 are each provided with a roller 44 that abuts a corresponding one of the workpieces W. This enables the support 40 to smoothly travel on the workpieces W. The roller 44 is made of an electrically-insulating member. This enables prevention of a short circuit between the roller 44 and the corresponding one of the workpieces W. The roller 44 may be provided to either one of the first columnar part 42 and the second columnar part 43.

The connection part 41 connects together the respective ends, closer to the fusion welding hand 30, of the first columnar part 42 and the second columnar part 43. More specifically, the connection part 41 connects an end, closer to the fusion welding hand 30, of the hand-side first columnar part 421 with an end, closer to the fusion welding hand 30, of the hand-side second columnar part 431. The connection part 41 is a member attached to the hand body 31 by using an attachment tool.

The support 40 travels on the workpieces W as the fusion welding hand 30 is moved by the motion of the robot arm 20. The support 40 is provided so as not to travel on a portion B having been fusion welded. More specifically, the support 40 is provided so as to travel ahead of the fusion welding hand 30 in a travelling direction (X2 direction) of the fusion welding hand 30. The support 40 travels such that the joint A of the workpieces W is located between the first columnar part 42 and the second columnar part 43. In other words, the first columnar part 42 travels on one of the workpieces W butting against each other, and the second columnar part 43 travels on the other. This enables the support 40 to stably move on the workpieces. The support 40 may be designed to travel on one of the workpieces W. For example, in a case where the workpieces W are to be fused and joined together via a joint such as a T joint or a corner joint, the support 40 may be provided to the fusion welding hand so as to travel on one of the workpieces W along the joint A of the workpieces W with a space being left between the support 40 and the joint A.

FIG. 4 is a view of the force sensor 35 disposed in the fusion welding device 1 illustrated in FIG. 1. The force sensor 35 is disposed in the support 40, as described above. This enables the force sensor 35 to detect forces and moments exerted by the workpieces W and directly acting on the support 40. It is therefore easy to create a motion program for the robot arm 20. As illustrated in FIG. 4, the force sensor 35 is a six-axis force sensor capable of concurrent detection of loads (Fx, Fy, Fz) in an X-axis direction, a Y-axis direction, and a Z-axis direction and moments (Mx, My, Mz) in the X-axis, Y-axis, and Z-axis directions. The force sensor 35 is a strain gauge sensor including: a first member 36 having a first face 36a; a second member 37 having a second face 37a; and a strain element (not illustrated) disposed between the first member 36 and the second member 37. The force sensor 35 is not limited to a strain gauge sensor, but may be a piezoelectric force sensor, an optical force sensor, or other force sensor.

The force sensor 35 is a sensor for detecting forces and moments exerted, through the support 40, by workpieces W. More specifically, the force sensor 35 disposed in the first columnar part 42 detects forces and moments acting on the first columnar part 42. The force sensor 35 disposed in the second columnar part 43 detects forces and moments acting on the second columnar part 43. The force sensor 35 disposed in the first columnar part 42 is disposed such that the first face 36a of the first member 36 faces the fusion welding hand 30. The force sensor 35 disposed in the second columnar part 43 is disposed such that the second face 37a of the second member 37 faces the workpieces W.

The following description will discuss a force and a moment acting on the support 40 with reference to FIG. 5. This description will be made on the assumption that the fusion welding hand travels in the X2 direction. As illustrated in FIG. 5, the control device 50 controls the motion of the robot arm 20 such that the support 40 abuts on the workpieces W.

When the support 40 abuts on the workpieces W, forces and moments act on the support 40. A force FZ in the Z-axis direction, a force with which the support 40 is pushed against the workpieces W, acts on the support 40. The force sensor 35 detects the force FZ (hereinafter, referred to as "normal reaction FZ"), which is equivalent to a normal reaction acting on the support 40. In accordance with a value of the force FZ detected by the force sensor 35, the robot arm 20 is controlled by the control device 50 to move in a direction in which the fusion welding hand 30 is made close to the workpieces W or away from the workpieces W. In this manner, the position of the fusion welding hand 30 with respect to the workpieces W is maintained at a predetermined position. The normal reaction FZ acting on the support 40 being maintained constant makes it possible to maintain constant the position of the fusion welding head 32 with respect to the workpieces W even when the workpieces W have irregularities or a curved surface.

When the fusion welding hand 30 travels to reach an inclined face portion inclined in the travelling direction (X2 direction), a first turning moment MY acts on the support 40. The first turning moment MY is a moment about a rotational axis that is parallel to surfaces of the workpieces W on which the support 40 abuts and that is orthogonal to the travelling direction of the fusion welding hand 30. In other words, the first turning moment MY is a moment about a rotational axis orthogonal to the travelling direction of the support 40. The control device 50 controls the inclination of the robot arm 20 to the workpieces such that the first turning moment MY detected by the force sensor 35 falls within a preset range. In this manner, the angle of the fusion welding head 32 with respect to the workpieces W is maintained at a predetermined condition.

When the fusion welding hand 30 travels to reach an inclined face portion inclined in a direction (Y1-Y2) intersecting the travelling direction (X2 direction), a second turning moment MX acts on the support 40, although this is not illustrated. The second turning moment MX is a moment about a rotational axis that is parallel to surfaces of the workpieces W on which the support 40 abuts and that extends along the travelling direction of the fusion welding hand 30. In other words, the second turning moment MX is a moment about a rotational axis along the travelling direction of the support 40. The control device 50 controls the inclination of the robot arm 20 to the workpieces such that the second turning moment MX detected by the force sensor 35 falls within a preset range. In this manner, the angle of the fusion welding head 32 with respect to the workpieces W is maintained at a predetermined condition.

Figure 6:
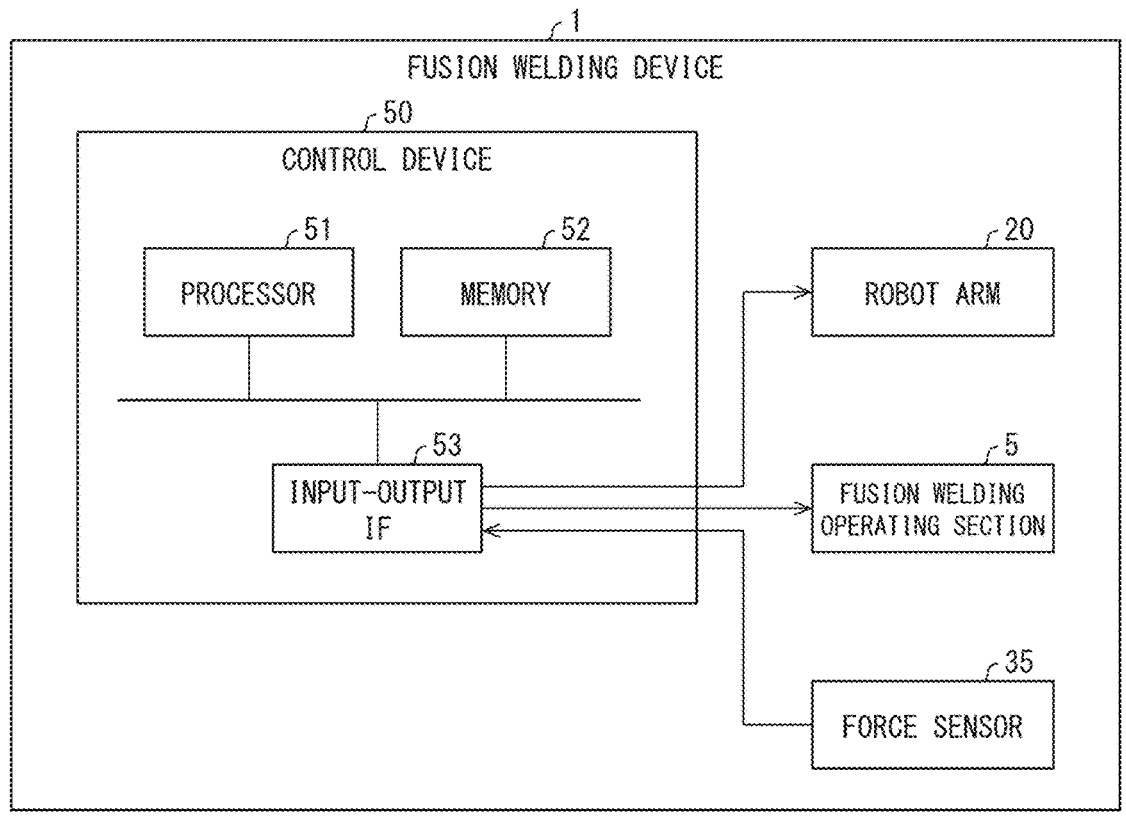
FIG. 6 is a diagram of a hardware configuration of the fusion welding device in accordance with Embodiment 1 of the present invention.

FIG. 6 is a diagram of a hardware configuration of the fusion welding device 1. As illustrated in FIG. 6, the control device 50 includes: a processor 51; a memory 52; and an input-output interface (IF) 53. The control device 50 is implemented by, for example, a personal computer (PC), a programmable logic controller (PLC). The processor 51, the memory 52, and the input-output IF 53 are electrically connected with each other via a bus.

The processor 51 performs various kinds of control and various kinds of computation by executing various programs stored in the memory 52. Examples of the processor 51 include a central processing unit (CPU), a graphic processing unit (GPU), a digital signal processor (DSP), a micro processing unit (MPU), and a combination thereof. For example, the processor 51 controls the motion of the robot arm 20.

The memory 52 stores various programs to be executed by the processor 51. A program regarding fusion welding is stored in the memory 52. The program regarding fusion welding is a program in which the motion of the fusion welding device 1 as a whole and a control routine are described. Examples of the memory 52 include a read only memory (ROM), and a random access memory (RAM).

The input-output IF 53 is an interface for communicating with the robot arm 20, the force sensor 35, and the fusion welding operating section 5. Examples of the input-output IF 53 include a universal serial bus (USB), an advanced technology attachment (ATA), a small computer system interface (SCSI), and a serial communication interface.

Fusion Welding Device Control Method

Figure 7:
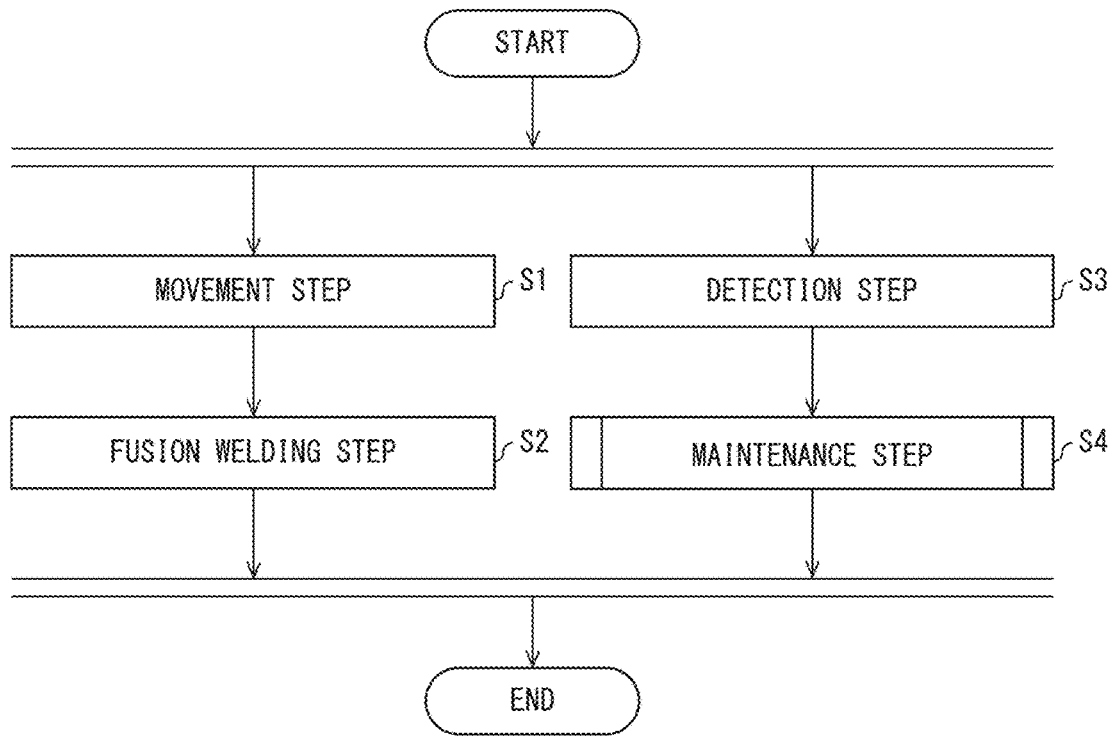
FIG. 7 is a flowchart of a fusion welding device control method in accordance with Embodiment 1 of the present invention.

The following description will discuss a method for controlling the fusion welding device 1 with reference to FIG. 7. FIG. 7 is a flowchart of a method, in accordance with Embodiment 1, for controlling the fusion welding device 1.

In a step S1, when the processor 51 executes the program regarding fusion welding, the control device 50 controls the motion of the robot arm 20. The motion of the robot arm 20 is adjusted according to the control by the control device 50 such that the position and angle of the robot arm 20 with respect to the workpieces W satisfy predetermined conditions. This sets the position and angle of the fusion welding head 32 with respect to the workpieces W to a position and an angle that satisfy the predetermined conditions. The position and angle of the fusion welding head 32 with respect to the workpieces W are adjusted in a maintenance step S4 to be maintained at the predetermined conditions. The maintenance step S4 will be described later in detail. Further, the motion of the robot arm 20 is controlled according to the control by the control device 50 such that the fusion welding hand 30 moves along the joint A of the workpieces W.

In a step S2, the fusion welding operating section 5 applies a voltage on the electrode of the fusion welding head 32 and the workpieces W according to the control by the control device 50. Applying a voltage causes an arc to form starting at the fusion welding head 32, and the workpieces W are joined together at the joint A by fusion welding.

In parallel with the step S1 and step S2, a step S3 and a step S4 are repeatedly carried out.

In the step S3, the force sensor 35 detects forces and moments exerted, through the support 40, by the workpieces W. More specifically, the force sensor 35 detects forces and moments acting on the support 40. Values of the forces and moments detected by the force sensor 35 are inputted to the control device 50 via the input-output IF 53.

In the step S4, the control device 50 corrects the motion of the robot arm 20 in accordance with the forces and moments detected in the step S3 such that the position and angle of the fusion welding head 32 with respect to the workpieces W are set to the predetermined conditions. In this manner, the position and angle of the fusion welding head 32 with respect to the workpieces W are maintained at the predetermined conditions.

Figure 8:
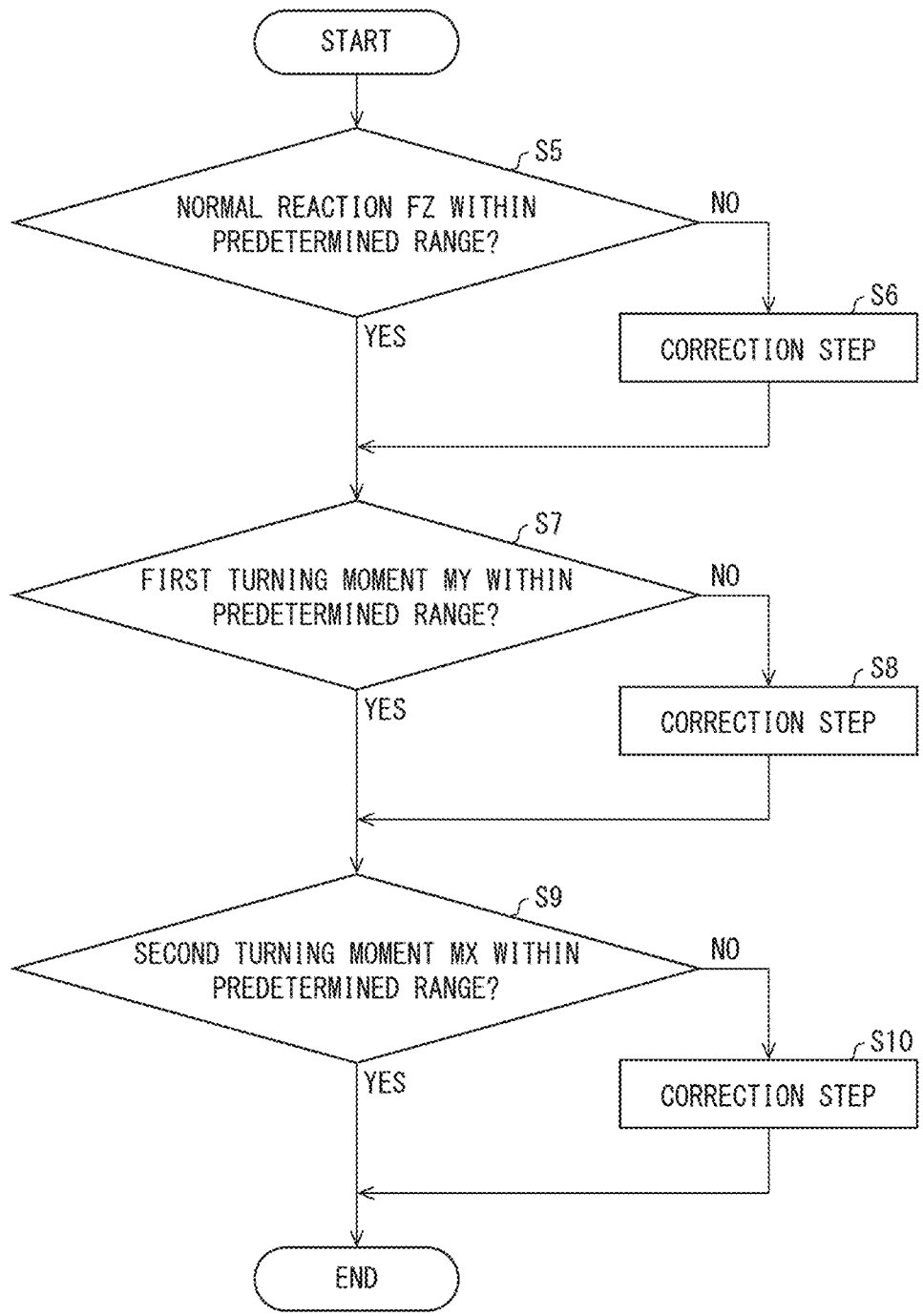
FIG. 8 is a flowchart of a maintenance step in the fusion welding device in accordance with Embodiment 1 of the present invention.

In the step S4, the control device 50 determines whether the value of the normal reaction FZ acting on the support 40 is within a predetermined range (S5), as illustrated in FIG. 8. If the value of the normal reaction FZ is within the predetermined range (if YES at S5), then the control device 50 carries out a step S7. If the value of the normal reaction FZ is not within the predetermined range (if NO at S5), then the control device 50 corrects the motion of the robot arm 20 such that the value of the normal reaction FZ detected falls within the predetermined range (S6). After the motion of the robot arm 20 is corrected through the step S6, the control device 50 carries out the step S7.

Next, the control device 50 determines whether the value of the first turning moment MY acting on the support 40 is within a predetermined range (S7). If the value of the first turning moment MY is within the predetermined range (if YES at S7), then the control device 50 carries out a step S9. If the value of the first turning moment MY is not within the predetermined range (if NO at S7), then the control device 50 corrects the motion of the robot arm 20 such that the value of the first turning moment MY detected falls within the predetermined range (S8). After the motion of the robot arm 20 is corrected through the step S8, the control device 50 carries out the step S9.

Next, the control device 50 determines whether the value of the second turning moment MX acting on the support 40 is within a predetermined range (S9). If the value of the second turning moment MX is within the predetermined range (if YES at S9), then the maintenance step S4 ends. If the value of the second turning moment MX is not within the predetermined range (if NO at S9), then the control device 50 corrects the motion of the robot arm 20 such that the value of the second turning moment MX detected falls within the predetermined range (S10). After the motion of the robot arm 20 is corrected through the step S10, the maintenance step S4 ends.

Variation 1

Figure 9:
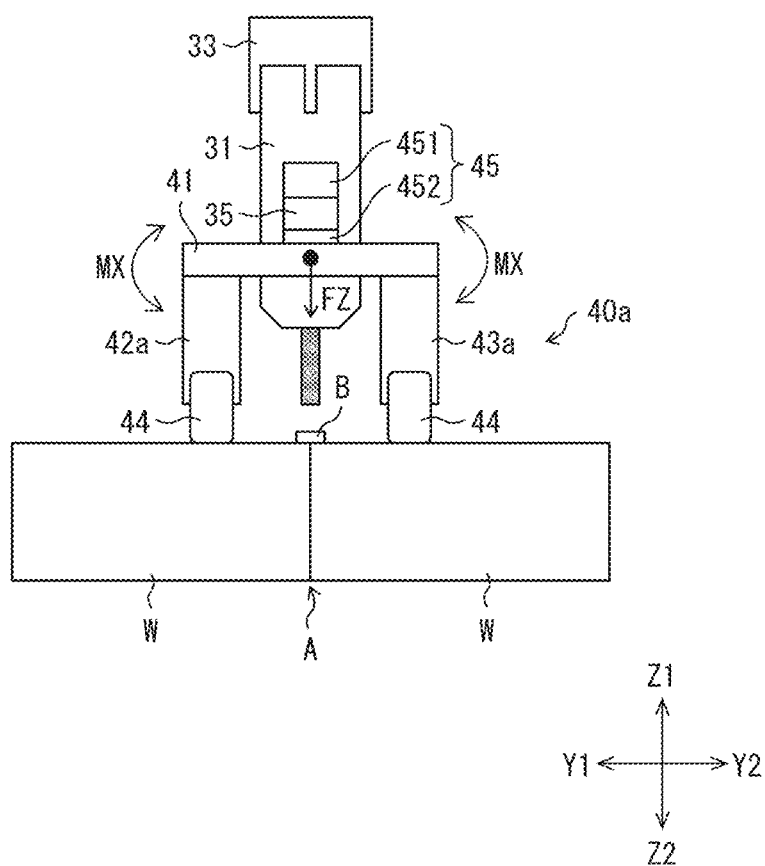
FIG. 9 is a view of Variation 1 of the support in accordance with Embodiment 1 of the present invention.

The following description will discuss Variation 1 of the support 40 in accordance with Embodiment 1 with reference to FIG. 9. FIG. 9 is a view of Variation 1 of the support 40 in accordance with Embodiment 1. In Variation 1, the force sensor 35 is provided in an attachment part 45.

As illustrated in FIG. 9, a support 40a in Variation 1 includes: a first columnar part 42a; a second columnar part 43a; and a connection part 41, and additionally includes the attachment part 45. The attachment part 45 is provided to the connection part 41. The attachment part 45 is a member attached to the attachment tool of the fusion welding hand 30. The attachment part 45 includes: a hand-side attachment part 451; and a workpiece-side attachment part 452. The force sensor 35 is disposed between the hand-side attachment part 451 and the workpiece-side attachment part 452. The force sensor 35 may be provided between the hand body 31 and a hand-side end of the attachment part 45. The force sensor 35 in accordance with Variation 1 detects forces and moments acting on the connection part 41.

In the step S3 above, the force sensor 35 detects a normal reaction FZ, a first turning moment MY, and a second turning moment MX that act on the connection part 41. The control device 50 then determines in the step S4 above whether the normal reaction FZ, the first turning moment MY, and the second turning moment MX are within predetermined ranges. When the value of at least any of the normal reaction FZ, the first turning moment MY, and the second turning moment MX is not within the predetermined range, the control device 50 corrects the motion of the robot arm 20 such that the normal reaction FZ, the first turning moment MY, and the second turning moment MX fall within the predetermined ranges.

This configuration makes it possible to keep the first columnar part 42a and the second columnar part 43a abutting on the workpieces W at any time, and therefore enables accurate detection of the forces and moments exerted, through the support 40a, by the workpieces W. Accordingly, the position and angle of the fusion welding head 32 with respect to the workpieces W are maintained at the predetermined conditions.

Embodiment 2

Figure 10:
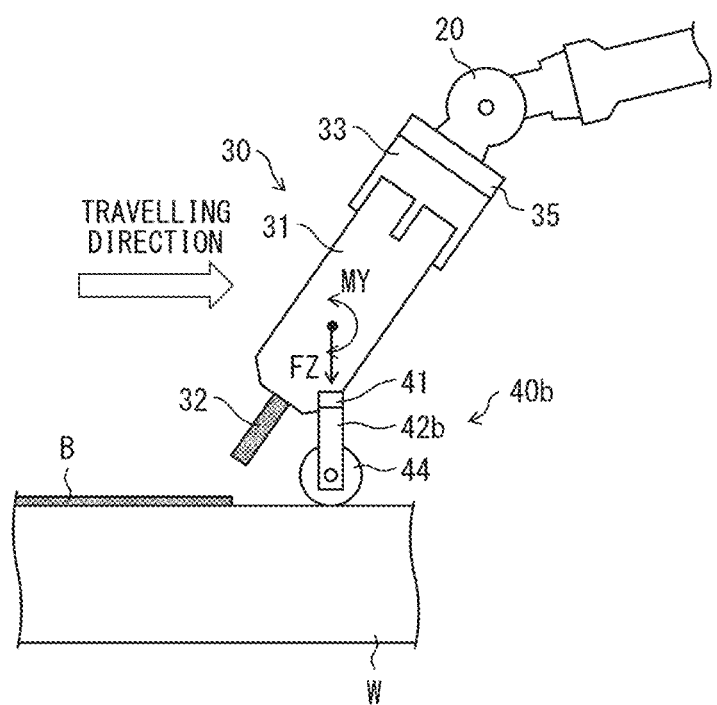
FIG. 10 is a view of a main part of a fusion welding device in accordance with Embodiment 2 of the present invention.

The following description will discuss another embodiment of the present invention with reference to FIG. 10. For convenience of description, a member having the same function as the member described in Embodiment 1 is assigned the same reference sign, and the description thereof is omitted.

FIG. 10 is a view of a main part of a fusion welding device in accordance with Embodiment 2. The fusion welding device in accordance with Embodiment 2 differs from the fusion welding device 1 in accordance with Embodiment 1 in that a force sensor 35 is disposed between the top end of a robot arm 20 and a fusion welding hand 30. The fusion welding device in accordance with Embodiment 2 differs from the fusion welding device 1 in accordance with Embodiment 1 also in that the force sensor 35 directly detects forces and moments acting on the fusion welding hand 30.

As illustrated in FIG. 10, the force sensor 35 is disposed between the top end of the robot arm 20 and an attachment member 33. The force sensor 35 is disposed such that a first face 36a of the force sensor is located facing the top end of the robot arm 20 and a second face 37a of the force sensor 35 is located facing the fusion welding hand 30. The force sensor 35 detects forces and moments acting, through the support 40, on the fusion welding hand 30.

The forces and moments acting on the fusion welding hand 30 and detected by the force sensor 35 are inputted to the control device 50 via the input-output IF 53. The control device 50 corrects the motion of the robot arm 20 in accordance with the detected forces and moments such that the position and angle of the fusion welding head 32 with respect to the workpieces W are set to the predetermined conditions.

According to the embodiments described above, the fusion welding devices are intended to carry out an arc welding in which electric energy is discharged from the fusion welding heads. The present application is applicable to a fusion welding in which another energy (light, heat) is discharged from the fusion welding head, such as, for example, laser welding or gas welding. In a case of laser welding, the fusion welding operating section 5 includes a laser oscillation section, and the fusion welding head is provided with a lens for conversing laser light pumped by the laser oscillation section. In a case of gas welding, the fusion welding operating section 5 includes a gas supply section, the fusion welding head is provided with a torch that discharges a gas supplied by the gas supply section and an ignition section for igniting the discharged gas.

According to the embodiments described above, the control devices are inside the fusion welding devices. However, the location of the control devices is not limited thereto. The control device may be outside the fusion welding device.

According to the embodiments described above, the robot arm is provided on the base fixed on a floor face. However, the present invention is not limited thereto. The robot arm may be mounted on a movable base having wheels.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: Fusion welding device
2: Fusion welding robot
5: Fusion welding operating section
10: Base
20: Robot arm
35: Force sensor
30: Fusion welding hand
31: Hand body
32: Fusion welding head
33: Attachment member
36: First member
37: Second member
40: Support
41: Connection part
42: First columnar part
43: Second columnar part
44: Roller
45: Attachment part
50: Control device
51: Processor
52: Memory
53: Input-output IF

The invention claimed is:
1. A fusion welding device comprising:
   a robot arm,
   a fusion welding hand attached to the robot arm and including a fusion welding head for fusing and joining together workpieces while being separated from the workpieces,
   a support provided to the fusion welding hand and abutting on the workpieces,
   a force sensor for detecting a force and a moment exerted, through the support, by the workpieces, and
   a processor configured to control motion of the robot arm in accordance with parameters calculated from a signal outputted from the force sensor, wherein
   the fusion welding head discharges electric energy,
   the support includes a roller abutting on the workpieces,
   the roller is made of an electrically-insulating member,
   a short circuit is prevented between the roller and the workpieces,
   wherein the parameters are moments exerted, via the support, by the workpieces, and include a first turning moment about a rotational axis orthogonal to a travelling direction of the fusion welding hand and a second turning moment about a rotational axis along the travelling direction of the fusion welding hand, and
   the processor is configured to control the motion of the robot arm to cause the first turning moment and the second turning moment to fall within predetermined ranges, thereby maintaining an angle of the fusion welding head with respect to the workpieces.

2. The fusion welding device according to claim 1, wherein
   the parameters include a normal reaction exerted, through the support, by the workpieces, and
   the processor is configured to control the motion of the robot arm in a direction in which the fusion welding hand is made close to the workpieces or away from the workpieces, such that the normal reaction is maintained constant in magnitude, thereby maintaining a predetermined position of the fusion welding head with respect to the workpieces.

3. The fusion welding device according to claim 1, wherein the force sensor is disposed in the support.

4. The fusion welding device according to claim 1, wherein
   the support includes a first columnar part and a second columnar part each of which abuts a corresponding one of the workpieces and which have a joint of the workpieces located therebetween, and
   the force sensor is disposed in each of the first columnar part and the second columnar part.

5. The fusion welding device according to claim 1, wherein the force sensor is disposed between the robot arm and the fusion welding hand.

6. The fusion welding device according to claim 1, wherein the support is provided so as not to travel on a portion having been fusion welded.

7. The fusion welding device according to claim 6, wherein the support is provided so as to travel ahead of the fusion welding hand in a travelling direction of the fusion welding hand.

8. A method for controlling a fusion welding device including a robot arm, a fusion welding hand attached to the robot arm and including a fusion welding head for fusing and joining together workpieces while being separated from the workpieces, a support provided to the fusion welding hand and abutting on the workpieces, and a force sensor for detecting a force and a moment exerted, through the support, by the workpieces, the method comprising:
   controlling motion of the robot arm in a direction in which the fusion welding hand is made close to the workpieces or away from the workpieces, in accordance with parameters calculated from a signal outputted from the force sensor, wherein the parameters include a normal reaction exerted, through the support, by the workpieces,
   wherein in said controlling the motion of the robot arm, the motion of the robot arm is controlled such that the normal reaction calculated from the signal outputted from the force sensor is maintained constant in magnitude, thereby maintaining a predetermined position of the fusion welding head with respect to the workpieces, wherein the parameters are moments exerted, via the support, by the workpieces, and include a first turning moment about a rotational axis orthogonal to a travelling direction of the fusion welding hand and a second turning moment about a rotational axis along the travelling direction of the fusion welding hand, and the controlling includes controlling the motion of the robot arm to cause the first turning moment and the second turning moment to fall within predetermined ranges, thereby maintaining an angle of the fusion welding head with respect to the workpieces.

* * * * *